Jan. 26, 1932.　　　F. G. HUGHES　　　1,842,971
HUB AND AXLE CONSTRUCTION
Filed June 30, 1928
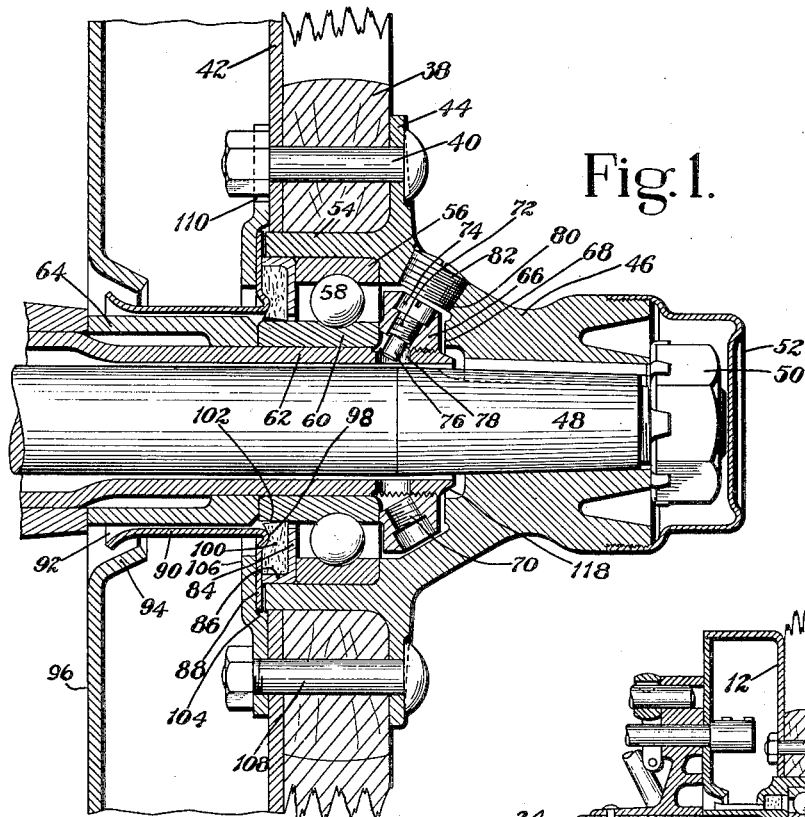
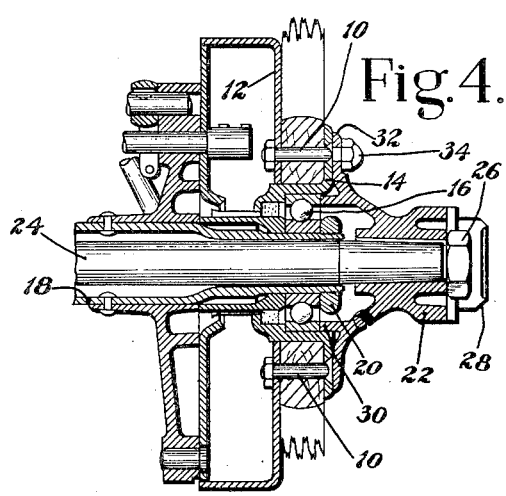
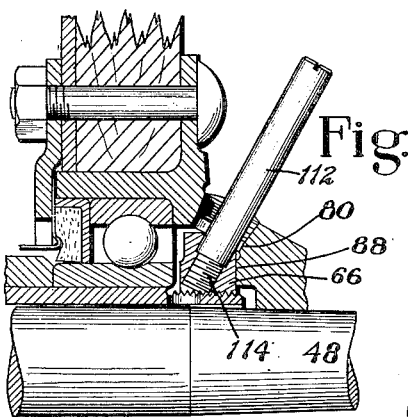
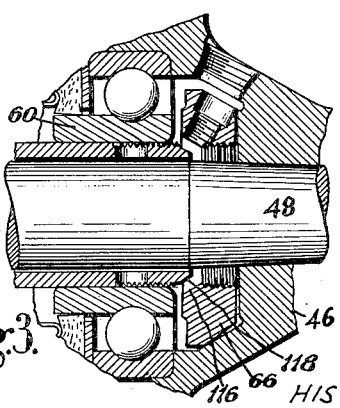
INVENTOR:
FREDERICK G. HUGHES,
BY
Gales P. Moore
HIS ATTORNEY.

Patented Jan. 26, 1932

1,842,971

UNITED STATES PATENT OFFICE

FREDERICK G. HUGHES, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT

HUB AND AXLE CONSTRUCTION

Application filed June 30, 1928. Serial No. 289,578.

This invention relates to hub and axle construction and comprises the features of novelty herein disclosed. In prior constructions of three-quarter floating axles for which the present invention is more especially adapted, removal of the wheel and bearing requires the preliminary removal of the hub cap, drive shaft nut and an outer detachable section of the hub to which the drive shaft is keyed. All these members must first be removed before the bearing locking nut can be reached. The necessity for the detachable hub section makes the hub more expensive and the removal of this hub section leaves the bearing exposed.

An object of the invention is to provide an improved construction for driven hubs whereby the hub, bearing and driving means can be readily removed as an assembled unit from an axle. Another object is to provide improved means for holding a hub on an axle and for stripping the hub from the axle. Another object is to provide a hub and bearing holding means enclosed within the hub and operable from outside the hub for stripping the hub and bearing from the axle. To these ends and to improve generally and in detail upon devices of this general character, the invention also consists in the various matters hereinafter described and claimed.

The invention, in its broader aspects, is not necessarily limited to the particular construction selected for illustration in the accompanying drawings in which Fig. 1 is a vertical central section of the assembled construction.

Fig. 2 is a similar view illustrating the hub and bearing assembly and the means for removing them from the axle.

Fig. 3 is a similar view illustrating the positions of the parts when free for final removal from the axle.

Fig. 4 is a vertical central section of a three-quarter floating axle of known construction.

In Fig. 4, the spokes of a wheel are clamped by bolts 10 between a brake drum 12 and a flanged hub member 14 which rotates on a bearing 16 on an axle casing 18. The bearing is held on the axle casing by a nut 20 and the hub has a removable outer section 22 which is keyed to a live axle or drive shaft 24 and locked by a nut 26 enclosed in a hub cap 28. The hub section 22 has a flange 30 engaging the outer race ring of the bearing and a flange 32 secured by nuts 34 on threaded extensions of some of the bolts 10. In this construction, to afford access to the nut 20 for removing the hub and bearing, the nuts 34, and hub section 22 must be removed. After backing off nut 20 a wheel puller may be necessary to strip the bearing from the axle. The hub construction is expensive because of its two part construction and the special bolts 10.

In Fig. 1, the spokes 38 of a wheel are clamped by plain bolts 40 between a brake drum 42 and a flange 44 of a one-piece hub member 46 which is keyed to a live axle or drive shaft 48 and held by a nut 50 enclosed in a hub cap 52. The hub member has a flange 54 receiving the outer race ring 56 of an antifriction bearing herein shown as a ball bearing 58, the inner race ring 60 being mounted on a dead axle 62 comprising an axle casing through which the drive shaft 48 extends. The inner race ring 60 is clamped against a spacing sleeve 64 by a locking member herein shown as a nut 66 threaded on the axle and enclosed within the hub adjacent to an annular face or end wall 68 thereof. The nut has a plurality of inclined tapped openings 70 any selected one of which receives a locking member in the form of a screw 72 having a head 74 and a projection 76 arranged to enter any one of a plurality of slots or openings 78 in the axle. Thus, the nut can be secured in any one of a considerable number of selected positions. The screw 72 is insertable through an inclined opening 80 in the hub, the opening also admitting lubricant and preferably being closed by a screw plug 82.

Fitting in the hub against the race ring 56 is a washer 84 having a flange 86 which projects slightly beyond the hub for engagement with a flange 88 on an oil shedding sleeve 90. The sleeve 90 has a flaring skirt 92 surrounded by a conical shield 94 on a brake drum closure plate 96. The sleeve also has an annular protuberance 98 engaging the side of a felt washer 100 housed in the flanged washer 84. Compression of the felt washer causes its inner periphery to assume a conical form thereby making a tapering capillary space at 102 between the felt and the wide inner race ring 60. The capillary space tends to prevent oil from escaping from the bearing. The flange 88 is seated in a recess 104 of a dished clamping ring 106 clamped to the hub by a series of plain bolts 108 occupying the spaces between the bolts 40. The nuts for the bolts 40 do not engage the clamping ring but occupy recesses 110 in the scalloped periphery of the ring. Hence, the removal of the nuts from one set of bolts 108 enables the clamping ring to be removed for access to the bearing and oil seal. The outer race ring 56 of the bearing is thus clamped in the hub by the flanges 86, 88 and the clamping ring 106 and, inasmuch as the bearing will carry thrust load, the removal of the hub will enable the entire bearing to be stripped from the axle if the nut 66 can be removed.

To remove the hub from the axle, the screw plug 82 is removed by a screw driver and this affords access to the screw 72 which is taken out through the opening. As indicated in Fig. 2, a pin 112 having a threaded extension 114 is next passed through the hub opening 80 into one of the tapped openings in the nut. Then by rotating the hub in the proper direction, the nut is compelled by the pin to rotate likewise and back off of the axle. The nut, of course, has a normal clearance with the hub but as soon as it meets the end wall 68, the hub also must move axially towards the end of the axle. The live axle or drive shaft 48 and the bearing assembly are likewise forced lengthwise of the axle until the parts occupy the position indicated in Fig. 3 where the inner race ring 60 is sufficiently loosened as to readily come off the axle without the power afforded by the nut. The nut 66 is still retained in the hub although it may drop and tilt a little in its recess as indicated. Thus the entire hub, bearing and drive shaft assembly is removable as a unit from the axle with the aid of a screw driver and pin. Only two screw threaded members need to be detached and the bearing is kept enclosed and undisturbed. The use of a wheel puller is unnecessary because the nut performs that function. Even the locking pin 112 can be dispensed with by partially backing off the screw 72 until its head 74 enters the hub opening 80. When assembling, the end wall 68 of the hub will push the nut back on the axle, a conical guiding face 116 on the nut riding up a chamfer 118 on the axle to lift and center the nut.

I claim:

1. In a device of the character described, an axle, a wheel hub, a bearing between the hub and the axle, a nut threaded on the axle for holding the bearing, the nut having an opening and the hub and the axle each having an opening registerable with the opening in the nut, and a locking member engaging the openings in the nut and axle, said member being movable outwardly of the nut into the opening in the hub; substantially as described.

2. In a device of the character described, an axle casing, a bearing on the axle casing, a nut threaded on the axle casing for holding the bearing, a hub member rotatably supported by the bearing and enclosing the nut, a driving shaft extending through the axle casing and connected to the hub member, and means for rotating the nut to cause it to engage the hub member for moving the hub member, bearing and drive shaft as an assembled unit towards the end of the axle casing; substantially as described.

3. In a device of the character described, an axle, a wheel hub, a bearing between the wheel hub and the axle, a nut enclosed within the hub and threaded on the axle for holding the bearing, the nut and the axle having registerable openings, and a locking member insertable through an opening in the hub for engaging registered openings in the nut and the axle; substantially as described.

4. In a device of the character described, an axle, a wheel hub, a bearing between the wheel hub and the axle, a nut enclosed within the hub and threaded on the axle for holding the bearing, the axle having a plurality of openings and the nut having a plurality of openings, and a locking member insertable through the hub into a selected opening of the nut for engagement with a registered opening in the axle; substantially as described.

5. In a device of the character described, an axle casing, a bearing on the axle casing, a nut threaded on the axle casing for holding the bearing, a hub member rotatably supported by the bearing and enclosing the nut, a drive shaft extending through the axle casing and connected to the hub member, the end of the axle casing being tapered and the nut having a tapering portion to center the nut on the end of the casing, the hub member having a recess with a flat end wall adjacent to the outer side of the nut, and means for rotating the nut on the axle casing to engage the flat end wall of the hub member and thereby force the hub member, bearing and drive shaft as a unit towards the end of the axle casing; substantially as described.

In testimony whereof I hereunto affix my signature.

FREDERICK G. HUGHES.